United States Patent [19]
Winchell

[11] 3,743,319
[45] July 3, 1973

[54] VEHICLE OCCUPANT RESTRAINING BELT SYSTEM

[75] Inventor: Frank J. Winchell, Orchard Lake, Mich.

[73] Assignee: General Motors Corporation, Detroit, Mich.

[22] Filed: Nov. 19, 1971

[21] Appl. No.: 200,379

[52] U.S. Cl. .................................. 280/150 SB
[51] Int. Cl. ................................... B60r 21/02
[58] Field of Search ......................... 280/150 SB

[56] References Cited
UNITED STATES PATENTS
3,583,726  6/1971  Lindblad ................. 280/150 SB
3,684,310  8/1972  Weststrate ............... 280/150 SB Primary Examiner—Benjamin Hersh
Assistant Examiner—Robert R. Song
Attorney—W. E. Finken and Herbert Furman

[57] ABSTRACT

A vehicle occupant restraining belt system includes a first belt whose one end is affixed to the upper inboard portion of a vehicle seat and whose other end is affixed to the body adjacent the lower inboard portion of the seat. An apertured member slidably divides the first belt into lap and shoulder belt portions. A second belt has one end affixed to the apertured member and the other end received in a door mounted releasable retractor which, when the door is closed, draws the respective belt portions to restraining positions across the lap and chest of the seat occupant. A hook assembly attached to the apertured member is manually engageable with a retainer mounted on the instrument panel when the retractor is released to move the belts to an easy-enter position providing an unobstructed path of occupant ingress and egress when the door is open. The hook assembly is manually disengaged when the door is closed to permit the retractor to move the belt portions of their occupant restraining positions.

3 Claims, 3 Drawing Figures

PATENTED JUL 3 1973　　　　　　　　　　　　3,743,319
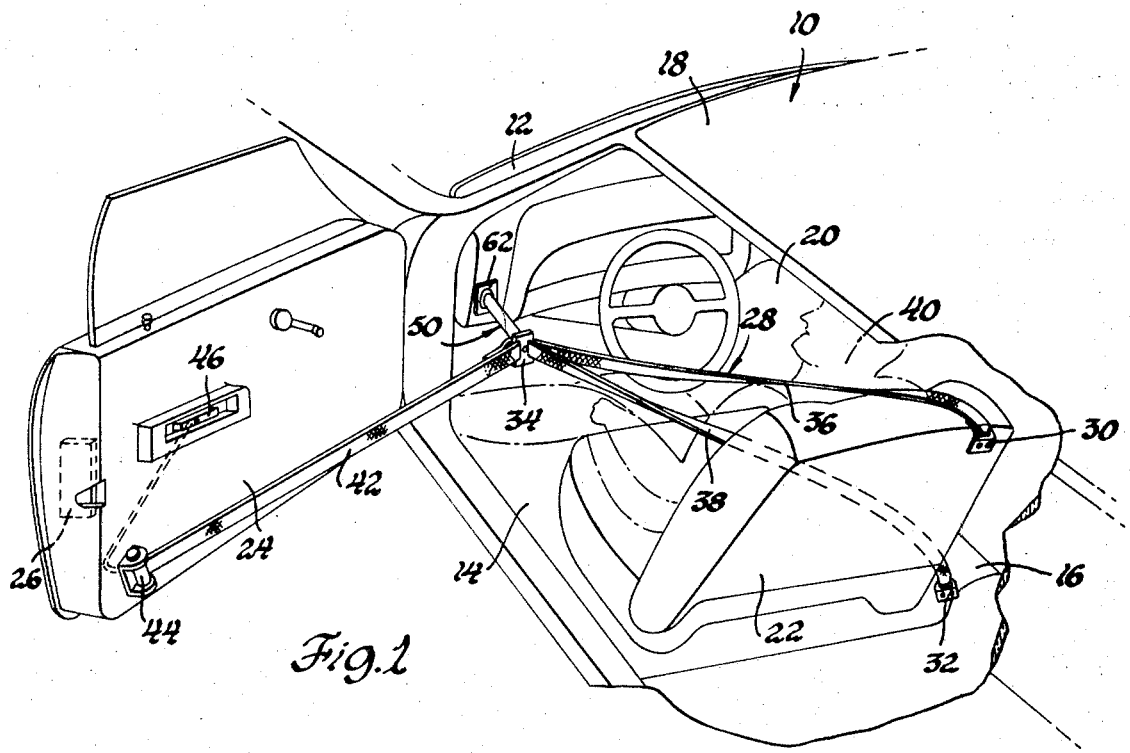
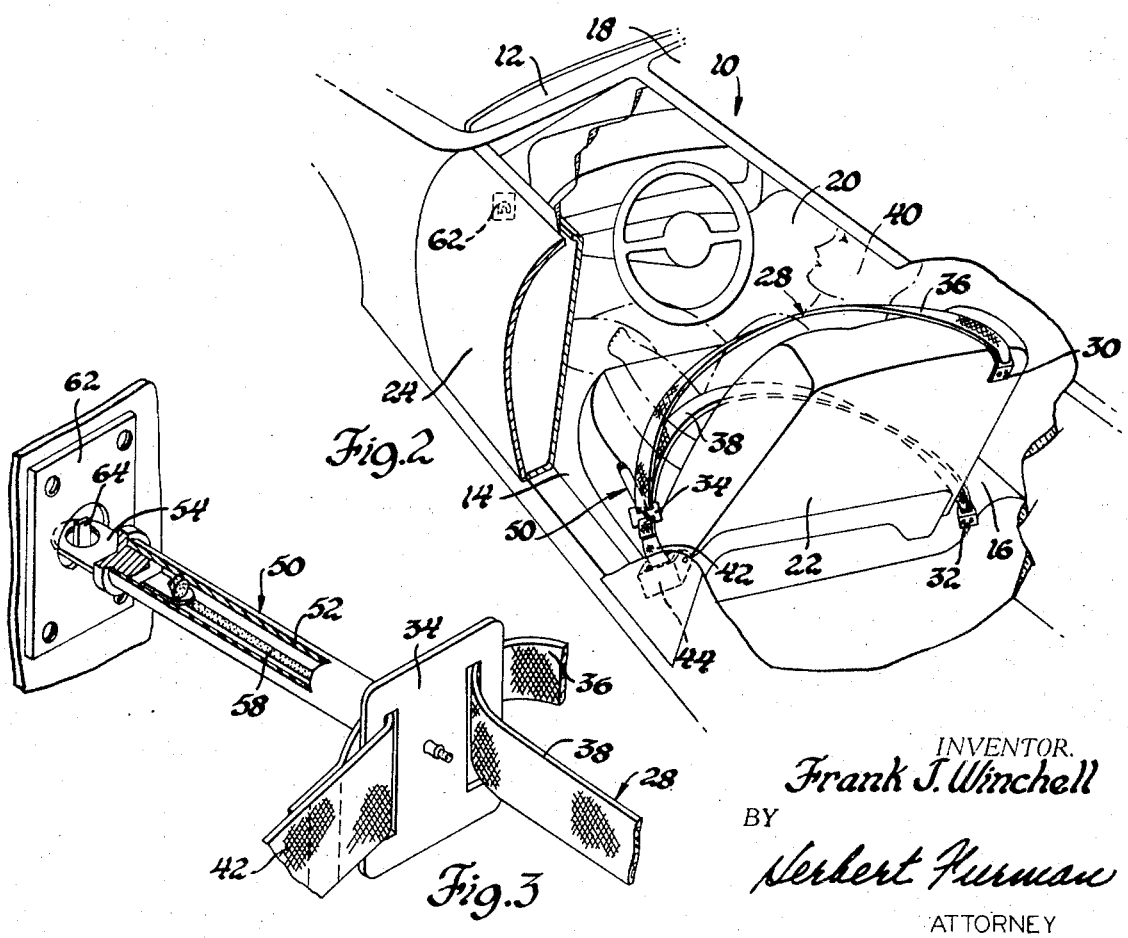
INVENTOR.
Frank J. Winchell
BY
Herbert Furman
ATTORNEY

VEHICLE OCCUPANT RESTRAINING BELT SYSTEM

The invention relates to vehicle occupant restraining belt system.

It is known to provide a vehicle occupant restraining belt system in which shoulder and lap belts are respectively attached at one end to the body and releasably secured to the body at their respective other ends.

It is also known to provide such a system in which a door mounted inertia retractor or a releasable retractor responsive to door movement permits movement of the belt system between occupant restraining and easy-enter positions.

The present invention provides an occupant restraining belt system in which a door mounted retractor is releasable to permit the occupant to move the belt system from a restraining position to an easy-enter position and to engage a hook assembly slidably mounted on the belt system with a retainer on the instrument panel to hold the belt system in the easy-enter position until the hook assembly is released.

Generally, the belt system includes a first belt having one end secured to an upper inboard portion of the vehicle seat and the other end secured to the body adjacent a lower inboard portion of the seat. An apertured member is slidably received on an intermediate portion of the first belt dividing the belt into shoulder and lap belt portions. A second belt has one end attached to the apertured member and the other end received in a releasable retractor mounted on a lower rear portion of the vehicle door. A hook assembly is yieldably attached to the apertured member and is manually engageable with a retainer mounted on the instrument panel when the retractor is released to hold the belts in an easy-enter position forward of the seat. When the occupant enters the vehicle and closes the door the hook is manually disengaged from the retainer and the retractor draws the belts to their occupant restraining position across the occupant's lap and chest. The yieldable hook assembly accommodates seat movement, permitting the seated occupant to adjust the seat while the belt system is in the easy-enter position.

Thus, it may be seen that one of the features of the invention is that an occupant may position a belt system in either easy-enter or occupant restraint positions by the respective engagement and release of a hook and an instrument panel mounted retainer.

Another feature is that the hook assembly permits adjusting movement of the seat while engaged with the instrument panel.

These and other features of the invention will be readily apparent from the detailed description and drawings in which:

FIG. 1 is a partially broken away view of a portion of a vehicle body including a belt system according to the invention shown in an easy-enter position with the vehicle body door in open position;

FIG. 2 is a similar to FIG. 1 showing the belt system in occupant restraining position with the door in closed position; and FIG. 3 is a partially broken away perspective view of the hook assembly.

Referring now to the drawings, a vehicle body is generally indicated by 10 and includes a conventional windshield 12, a vehicle body floor 14 with a conventional transmission tunnel 16, and a roof 18 which cooperate to define an occupant compartment 20 in a conventional manner. A conventional vehicle seat 22 is mounted within the occupant compartment 20 in the usual manner and is accessible through a vehicle body door opening selectively opened and closed by a vehicle body door 24 whose front edge is pivoted to the vehicle body 10 and whose rear edge is releasably latched to the body by a door latch 26.

A belt system according to the invention includes a first belt 28 whose one end is secured to an upper inboard portion of the back of seat 22 by an attachment 30 while the other end thereof is secured to the transmission tunnel 16, generally below the attachment 30, by an attachment 32. An intermediate portion of belt 28 is slidably received through an aperture member 34 to divide belt 28 into a shoulder belt portion 36 and a lap belt portion 38 that cooperate in restraining position, as shown in FIG. 2, to restrain a phantom line indicated seated occupant 40.

A second belt 42 has one end secured to the apertured member 34 and the other end secured to a retractor 44 mounted on the lower rearward portion of the door 24. The retractor 44 is preferably of the type shown in Ser. No. 145,797, filed May 21, 1971, Arlauskas et al. Control Means for Occupant Restraint Belt Retractor, assigned to the assignee of this invention. Such a retractor includes a rotatable reel which normally retracts the belt 42 and is locked against protracting movement of belt 42. The rotatable reel is interlocked with the inside remote handle 46 in such a manner as to unlock the rotatable reel and permit protraction of belt 42 upon occupant actuation of the remote handle 36.

A hook assembly generally designated 50, and best shown in FIG. 3, is employed to position the belts 28 and 42 in their easy-enter position shown in FIG. 1 to permit ease of occupant ingress and egress to and from the seat. The hook assembly 50 includes a tube 52 having the flanged body portion of a hook 54 press-fitted in the forward end thereof. An aperture inner tab of the hook 54 receives one end of an elastic cord 58 which is attached thereto by a knot or a clip. The elastic cord 58 extends through the tube 52 and an aperture in member 34 and has the other end thereof knotted or clipped for retention to the apertured member 34. The elastic cord 58 is pretensioned to hold the end of tube 52 opposite hook 54 in engagement with aperture member 34. A suitable spring may be substituted for cord 58. A retainer 62 is conventionally attached to the instrument panel and includes a pin 64 which partially bisects an aperture in the retainer 62. An apertured outer tab of hook 54 is manually engageable with the pin 64 to locate member 34 as shown in FIG. 1 and hold the belts 28 and 42 in their easy-enter positions.

When the occupant enters the occupant compartment and closes the door, he grasps tube 52 and lifts hook 54 from pin 64. This permits the retractor 44 to retract belt 42 and locate the shoulder portion 36 and lap portion 38 of belt 28 in occupant restraining position across the chest and lap of the seated occupant as shown in FIG. 2. The occupant may release tube 52 upon release of hook 54 or as belt 42 is being retracted. The elastic cord 58 of the hook assembly yields as needed in the event that the seat occupant adjusts the seat 22 rearwardly prior to disengaging hook 54 from retainer 62. The pretensioned elastic cord 58 holds tube 52 in engagement with the apertured member 34 when the belts are in occupant restraining position.

In order to exit the vehicle, the seat occupant must actuate door handle 46 to release the door latch and unlock retractor 44 so that belt 42 may be protracted to permit opening movement of the door and manual engagement of the hook 54 with the retainer 62 to locate the belts in their ease-enter positions of FIG. 1.

It is noted that while in the preferred embodiment the retractor 44 is interconnected to the door latch 46 for release thereof, other types of conventional retractors may be employed. Furthermore, the attachment 30 of shoulder belt 36 may be to the roof panel while the attachment 32 of lap belt 38 may be to a lower inboard portion of the seat 22.

Thus, the invention provides an occupant restraining belt system.

What is claimed is:

1. In combination with a vehicle body including an instrument panel, a vehicle seat for supporting a seated occupant, and a vehicle body door having one edge hinged to the vehicle body and the other edge free swinging to selectively open and close a vehicle body door opening, an occupant restraining belt system comprising, a first belt, means securing the respective ends of the first belt to the body in vertically spaced relationship inboard of the seated occupant, a second belt, said second belt including means slidably securing one end of the second belt to an intermediate portion of the first belt to divide the first belt into lap and shoulder belt portions, retractor means mounted adjacent the free swinging edge of the door, means securing the other end of the second belt to the retractor means for retraction and protraction with respect thereto to respectively locate the lap and shoulder belt portions of the first belt in an occupant restraining position across the lap and chest of the seated occupant or permit movement of such portions forwardly of the seated occupant to an easy-enter position, retainer means mounted on the instrument panel, and hook means secured to the second belt and manually engageable with the retainer means to hold the first belt in the easy-enter position and permit occupant ingress and egress when the door is in open position.

2. The combination of claim 1 wherein the hook means includes elastic means permitting movement of the first belt relative the instrument panel when the hook means is engaged with the retainer means.

3. In combination with a vehicle body including an instrument panel, a vehicle seat for supporting a seated occupant, and a vehicle body door having one edge hinged to the vehicle body and the other edge free swinging to selectively open and close a vehicle body door opening, an occupant restraining belt system comprising, a first belt, means securing the respective ends of the belt to the body in vertically spaced relationship inboard of the seated occupant, a second belt, an apertured member attached to one end of the second belt and slidably engaging an intermediate portion of the first belt to divide the first belt into lap and shoulder belt portions, retractor means mounted adjacent the free swinging edge of the door, means securing the other end of the second belt to the retractor means for retraction and protraction with respect thereto to respectively locate the lap and shoulder belt portions of the first belt in occupant restraining positions across the lap and chest of the seated occupant or permit movement of such portions forwardly of the seated occupant to an easy-enter position, retainer means mounted on the instrument panel, and hook means secured to the apertured member and manually engageable with the retainer means to hold the first belt in the easy-enter position and permit occupant ingress and egress when the door is in open position, said hook means including a hook member, elastic means connected to the apertured member and hook member, and means of fixed length engaging the apertured member and hook member to pretension the elastic means, the elastic means permitting movement of the apertured member away from the means of fixed length to permit movement of the first belt relative the instrument panel when the hook means is engaged with the retainer means.

* * * * *